Nov. 10, 1931. L. T. FREDERICK 1,831,064
MACHINE FOR MAKING COMPOSITE MATERIAL
Original Filed Dec. 23, 1926
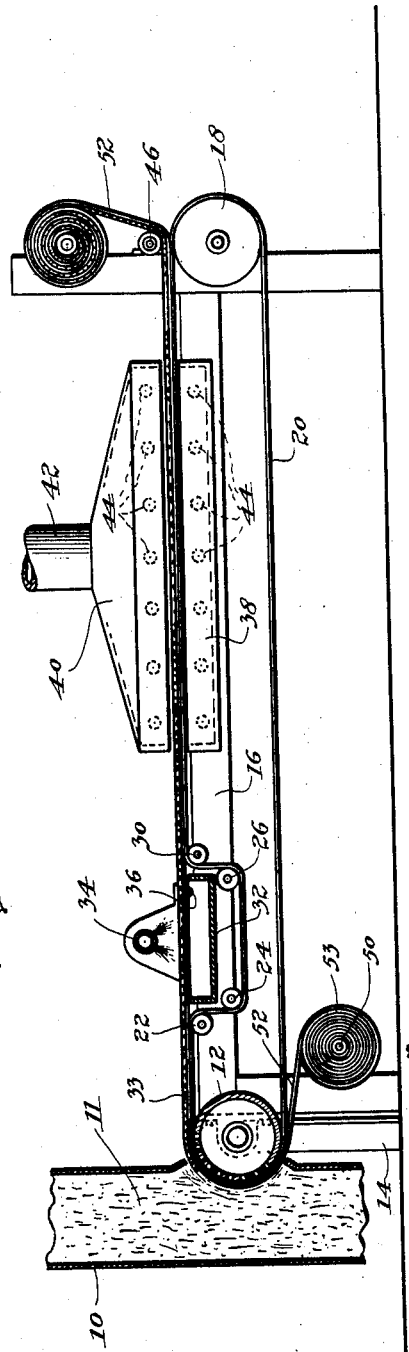
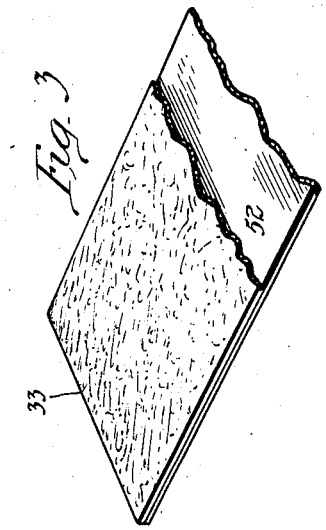
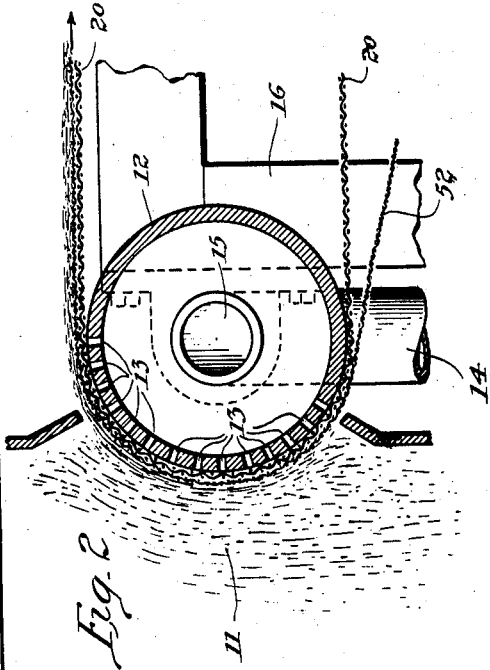
Inventor:
Louis T. Frederick
By Cheever & Cox
Attys.

Patented Nov. 10, 1931

1,831,064

UNITED STATES PATENT OFFICE

LOUIS T. FREDERICK, OF VALPARAISO, INDIANA, ASSIGNOR, BY MESNE ASSIGNMENTS, TO CONTINENTAL DIAMOND FIBRE COMPANY, OF NEWARK, DELAWARE, A CORPORATION OF DELAWARE

MACHINE FOR MAKING COMPOSITE MATERIAL

Original application filed December 23, 1926, Serial No. 156,630. Divided and this application filed March 17, 1928. Serial No. 262,401.

My invention relates in general to apparatus for the commercial production of composite materials of the general type comprising fibrous materials secured together in a compact substantially impervious sheet by means of a suitable binder, which in the preferred instance may comprise a re-action product of phenol formaldehyde or other suitable heat curable binder material. More particularly, my present invention contemplates the provision of a machine adapted to manufacture dry sheets or strips of fibrous material secured together by means of a re-action or condensation product in unreacted condition, that is to say, uncured, so that the resulting sheets may be thereafter arranged in stacks of a desired height and cured by the application of heat and pressure, to produce solid impervious plates, boards, gear blanks, and the like, of desired thickness.

An important object of my present invention is to provide an apparatus by means of which it is possible to utilize scraps of fibrous material consisting of otherwise wasted industrial by-products. For example, in the manufacture of shoes and the like, considerable quantities of duck or canvas scrap is produced, and the same is true in connection with the manufacture of clothing and similar products in which cloth material is used to produce a final product. Such scrap material is usually thrown away. The apparatus of my present invention is particularly adapted to utilize such waste scrap material in forming unreacted sheets of heat curable material.

Numerous other objects and advantages of the invention will appear as it is more fully understood from the following description which taken in connection with the accompanying drawings, discloses a preferred embodiment of my invention.

Referring to the drawings:

Figure 1 is a side elevation of the apparatus of my invention, parts of which are shown in cross section;

Figure 2 is an enlarged view of portions of the apparatus shown in Figure 1; and Figure 3 is a perspective view illustrating a form of product which may be produced by the apparatus of my invention.

To illustrate my invention, I have shown on the drawings a vertical chute or tower 10 through which scraps 11 of fibrous material such as waste industrial by-products, above mentioned, may pass. The chute has an opening at one side into which extends a portion of a stationary drum 12. This drum substantially fills the opening and is foraminated, that is to say, provided with a plurality of apertures 13 in the face of the drum which extends into the tower. Air is withdrawn continuously from the drum by means of a suction pipe 14 which opens at 15 into the drum 12 and consequently air is constantly sucked into the drum through the apertures and this creates a draft, from the chute 10 through the foraminated surface of the drum, which carries the scrap material toward the surface of the drum. The drum is suitably supported upon a frame-work or table 16 at the opposite end of which a pulley 18 is mounted for rotation. An endless screen belt 20 is carried by the drum and pulley, and means is provided for rotating the pulley 18 whereby the screen belt may be caused to travel around the drum and pulley. The belt is, of course, air pervious and hence permits air to be drawn from the chute through the belt and into the drum. A strip 52 of fabric material in the form of a roll 53, is mounted on a reel 50 suitably secured to the support table 16 adjacent the drum 12. The material is drawn from the roll 53 around the drum, passes along the upper stretch of the screen belt 20, passes around a guide roller 46 adjacent the roller 18 and is finally wound up upon the receiving reel 48. As the strip of material 52 passes around the drum 12, the suction created by the suction pipe 14 causes pieces of the scrap fibrous material passing through the chute 10 to be attracted to the outer surface of the fabric strip and to adhere thereto and be carried therewith across the upper stretch of the belt 20. The upper stretch of the screen belt does not have a continuous path but is deflected downwardly over a roller 22, thence forwardly around a roller 24, thence upwardly over a roller 26 and finally forwardly over a roller 30 into its original path. This arrangement is to accommodate a drip pan 32 which is arranged below the path of the fabric 52 in order to collect any drippings from a spray 34 arranged above the path of the fabric strip 52. This spray 34 is adapted to direct the liquid binding material upon the strip. The binder preferably used consists of a solution of a suitable reaction product such as phenol formaldehyde condensation or re-action product.

It will be apparent that pieces of subdivided fibrous material will be uniformly deposited as a thickly felted layer 33 upon the upper surface of the strip 52 and will be carried thereby beneath the spray 34 and will be there saturated with the re-action or condensation product used as a binder. It is desirable to provide a stripper rod 36 upon which the strip 52 may ride as it emerges from over the drip pan 32, the purpose of this rod being to remove the excess binder from the lower surface of the strip. A drying oven, carried by the support frame 16, and consisting of a case or housing 38 arranged beneath the upper stretch of the belt 20 and a hood 40 arranged above the belt, is located at a point in the apparatus beyond the spray 34 for the purpose of drying the binder deposited on the strip 52 and the layer 33 of chopped up material 11 carried thereon. The hood 40 is provided with a chimney or flue 42 for removing the fumes and moisture driven from the saturated strip. The housing 38 and the hood 40 are heated by means of controllable heating elements 44 which may comprise steam, gas, electrical, or other heating units of a controllable nature.

As above stated, the chopped up material in the chute 10 consists of small pieces of fibrous material such as canvas, duck, linen fabric, paper, cotton waste, or lint or the like, and as these particles fall downwardly through the chute they will be drawn by suction and float towards the drum 12 and pile themselves upon the air pervious strip of material 52 which over-lies the screen belt 20. The particles thus become felted or matted upon the strip 52 which acts as a foundation strip. The particles become matted on the strip to a thickness depending upon the intensity of the suction, the speed at which the belt 20 and the strip 52 pass around the drum, and the density of the stream of fibrous pieces in the chute 10.

Until the particles arrive at the top of the drum 12, they are held in place upon the strip 52 by suction. Thereafter they rest upon the strip during its horizontal run by gravity only.

When the binder used is of the phenol formaldehyde condensation and re-action product type, the product may be used in various ways, for example, it may be cut into sheets, the sheets piled one upon the other and the pile subjected to heat and pressure to produce a so-called laminated product; or the product may be chopped up or ground to produce a convenient moldable material which can be introduced into closing molds and there subjected to heat and pressure to produce various mechanical devices. One of the chief advantages, however, of my invention, is that it makes possible the production of a truly liminated product from small particles of chopped up material. It is well known to those familiar with the art, that a laminated product is stronger, as a rule, than is a product composed merely of small particles of fibrous material which have been irregularly scattered and secured together by an unreacted binder. My invention makes it possible to produce uniform sheets of material treated with unreacted binder and ready to be introduced into hot presses in which the re-action of the binder may be induced so that the sheets may be consolidated into the laminated product.

It is commercially impossible to attain the necessary thick matting of the fibrous particles by scattering chopped up material upon a moving backing strip, the cost of evenly distributing the chopped up particles in matted arrangement being prohibitively high. I have found also that the matting of the particles of material is accomplished in a much more satisfactory manner by the device of my invention, with the result that the ultimate product is stronger and more durable. It will be observed that the backing strip 52 remains with the rest of the product and in fact becomes a part of the sheet. Where thin and loosely woven fabric such as cheese-cloth or the like is employed as the backing strip, the suction of the air actually draws some of the fibrous material into the meshes of the backing strip so that to a certain extent they become incorporated therewith. This effect is enhanced somewhat by the binder which drips through the backing strip and tends to carry any loose fibers with it through the cheese-cloth. The result is the production of a strong product, and the final sheet may be handled as a unitary object.

I do not herein claim the method disclosed in this specification for the same forms the subject of my co-pending application, Serial No. 156,630, filed December 23, 1926, which resulted in Patent No. 1,799,506, issued April 7, 1931, and of which the present application comprises a division, nor do I claim herein the resulting product, since the same forms the subject matter of a co-pending application, Serial No. 176,416, filed March 18, 1927.

Having thus described my invention what I claim as new and desire to secure by Letters Patent is:

1. A machine of the class described comprising a tower, means to create a cloud of fibrous particles in the tower, means for supporting and exposing a portion of an air pervious strip to the inside of the tower, means for causing air to flow from the tower through the carrier whereby to draw the fibrous material in the tower and cause some of it to adhere to the carrier and become felted thereon, means to move the strip away from the tower and means for applying a binder to the material felted upon the strip.

2. A machine for producing composite fabricated strips, having an air pervious carrier, means for guiding an air pervious backing strip adjacent to the carrier, means for floating particles of fibrous material adjacent to the carrier and backing strip, means for causing particles of fibrous material to adhere to the backing strip, means for applying a binder to the fibers remaining on the backing strip, and means for removing the backing strip and fibers from the carrier.

3. A machine for producing composite fabricated strips, having an air pervious carrier, means for guiding an air pervious backing strip adjacent to the carrier, means for floating particles of fibrous material adjacent to the carrier and backing strip, means for causing particles of fibrous material to adhere to the backing strip, means for applying a binder to the fibers remaining on the backing strip, means for drying the binder, and means for removing the backing strip and fibers from the carrier.

4. In a machine for producing composite fabric material, an air pervious backing sheet, carrier means to move said backing sheet along a pre-determined path, means for floating particles of fibrous material adjacent the backing sheet at a station in its path of travel, means for introducing a draft through the backing sheet at said station to draw some of said particles to it to form a composite fabric, means for applying a binder to the fabric as it is carried along to impregnate the fabric, means to support the backing sheet within the zone of action of the binder applying means to permit excessive binder to pass through the backing sheet and means for removing the impregnated fabric from the carrier means.

5. In a machine for producing fabricated material, means including an air pervious conveyor for guiding a backing sheet along a pre-determined path, means for floating particles of fibrous material adjacent the backing sheet at a station in its path of travel on the backing sheet, means for introducing a draft through the carrier at said station to draw particles of fibrous material onto the backing sheet, means for applying a binder to the particles as they are carried along by the carrier, means within the zone of action of the binder applying means for causing the carrier to detour and separate from the fabric within said zone, and means located at said detour for collecting the surplus binder that passes through said fabric sheet.

6. In a machine for producing fabricated material, an air pervious carrier, an air pervious backing strip traveling along said carrier, means for floating particles of fibrous material adjacent to the carrier at one point, means for inducing draft through the carrier and backing strip at that point to draw some of said particles to the backing strip to cause them to mat thereon, means for supplying liquid binder to the work material at one point of travel thereof, and means at the zone of action of the binder supplying means for separately routing the carrier from the backing strip and fibrous material.

7. In a machine for producing composite fabric material, an air pervious backing sheet, carrier means to move said backing sheet along a pre-determined path, means for floating particles of fibrous material adjacent the backing sheet at a station in its path of travel, means for introducing a draft through the backing sheet at said station to draw some of said particles to it to form a composite fabric, means for applying a binder to the fabric as it is carried along to impregnate the fabric.

8. In a machine for producing composite fabric material, an air pervious backing sheet, carrier means to move said backing sheet along a pre-determined path, means for floating particles of fibrous material adjacent the backing sheet at a station in its path of travel, means for introducing a draft through the backing sheet at said station to draw some of said particles to it to form a composite fabric, means for applying a binder to the fabric as it is carried along to impregnate the fabric, means to support the backing sheet within the zone of action of the binder applying means to permit excessive binder to pass through the backing sheet.

In witness whereof I have hereunto subscribed my name.

LOUIS T. FREDERICK.